US009860682B2

(12) United States Patent
Nakagawa (10) Patent No.: US 9,860,682 B2
(45) Date of Patent: Jan. 2, 2018

(54) COMMUNICATION APPARATUS AND CONTROL METHOD THEREFOR

(71) Applicant: CANON KABUSHIKI KAISHA, Tokyo (JP)

(72) Inventor: Toshiyuki Nakagawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/806,016

(22) Filed: Jul. 22, 2015

(65) Prior Publication Data

US 2016/0057567 A1 Feb. 25, 2016

(30) Foreign Application Priority Data

Aug. 19, 2014 (JP) .................................. 2014-167001

(51) Int. Cl.
*H04W 76/02* (2009.01)
*H04B 5/00* (2006.01)
*H04B 3/54* (2006.01)
*H04W 4/00* (2009.01)
*H04W 8/00* (2009.01)
*H04W 84/18* (2009.01)

(52) U.S. Cl.
CPC .......... *H04W 4/008* (2013.01); *H04B 5/0031* (2013.01); *H04W 8/005* (2013.01); *H04W 84/18* (2013.01)

(58) Field of Classification Search
CPC ..... H04W 4/008; H04W 8/005; H04W 76/02; H04W 76/023; H04B 5/0031; H04B 7/18558; H04B 3/544
See application file for complete search history.

(56) References Cited

U.S. PATENT DOCUMENTS

| 2005/0254524 A1 | 11/2005 | An .............................. 370/487 |
| 2010/0082794 A1* | 4/2010 | Hardacker ............ G06F 3/0482 709/223 |
| 2014/0306865 A1* | 10/2014 | Pan ....................... G06F 3/1423 345/2.1 |

(Continued)

FOREIGN PATENT DOCUMENTS

JP        5101801        12/2012

OTHER PUBLICATIONS

Wi-Fi Display Technical Task Group (Wi-Fi Display Technical Specification Version 1.0.0) Wi-Fi Alliance Technical Committee, Aug. 24, 2012 pp. 1-151.

*Primary Examiner* — Andrew Wendell
(74) *Attorney, Agent, or Firm* — Fitzpatrick, Cella, Harper & Scinto (57) ABSTRACT

A communication unit communicates with another apparatus through a network. A communication control unit uses the communication unit to transmit information indicating a role of the communication apparatus to another apparatus, receives information indicating a role of another apparatus from the other apparatus, and searches for another apparatus capable of communication. The role of the communication apparatus is set based on a role of a partner device selected as a communication partner from at least one apparatus capable of communication detected by the communication control unit so as to control transmission and reception of an image between the communication apparatus and the partner device.

15 Claims, 10 Drawing Sheets

(56) References Cited

U.S. PATENT DOCUMENTS

| | | | |
|---|---|---|---|
| 2014/0376892 A1* | 12/2014 | Yamamoto | H04N 5/91 386/349 |
| 2015/0058900 A1 | 2/2015 | Nakagawa | H04N 21/4147 |
| 2015/0296416 A1* | 10/2015 | Lee | H04W 8/005 370/331 |
| 2016/0034245 A1* | 2/2016 | Karunakaran | G06F 3/1454 345/2.2 |
| 2016/0154448 A1* | 6/2016 | Tomoda | G06F 1/305 713/300 |
| 2016/0157289 A1* | 6/2016 | Jung | H04L 67/104 370/338 |

* cited by examiner

COMMUNICATION APPARATUS AND CONTROL METHOD THEREFOR

BACKGROUND OF THE INVENTION

Field of the Invention

The present invention relates to a technique of transmitting/receiving an image through a network.

Description of the Related Art

In recent years, a technique of wirelessly mirroring a monitor screen has been standardized as Wi-Fi Display (Wi-Fi Miracast®). Mirroring is a technique of sharing a monitor screen by transmitting the monitor screen of a transmission apparatus to a reception apparatus through a network. A source device having a function of transmitting the monitor screen, a sink device having a function of receiving the monitor screen, and a dual-role capable device such as a tablet device having both the functions have been put into practice.

According to the Wi-Fi Display specification, it is necessary to determine a source device or sink device as the role of the dual-role capable device before a connection setup with another apparatus. The timing and measures of determining the role depart from the specification, and are not defined in Wi-Fi Display.

The user needs to set in advance the role of a conventional device having a dual-role function before searching for devices so that, for example, the device functions as a sink device when it is set in a standby mode, and functions as a source device when it is not set in the standby mode.

SUMMARY OF THE INVENTION

In one aspect, a communication apparatus comprising: a communication unit configured to communicate with another apparatus through a network; a communication control unit configured to use the communication unit to transmit information indicating a role of the communication apparatus to another apparatus, receive information indicating a role of another apparatus from the other apparatus, and search for another apparatus capable of communication; and a control unit configured to set the role of the communication apparatus based on a role of a partner device selected as a communication partner from at least one apparatus capable of communication detected by the communication control unit so as to control transmission and reception of an image between the communication apparatus and the partner device.

According to the aspect, it is possible to set the role of a dual-role capable device in accordance with the role of a communication partner.

Further features of the present invention will become apparent from the following description of exemplary embodiments with reference to the attached drawings.

DESCRIPTION OF THE EMBODIMENTS

A communication apparatus and a control method therefor according to each embodiment of the present invention will be described in detail below with reference to the accompanying drawings. Note that the embodiments are not intended to limit the claims of the present invention, and that not all the combinations of arrangements described in the embodiments are necessarily essential to the solve of the present invention.

First Embodiment

Apparatus Arrangement

Figure 1:
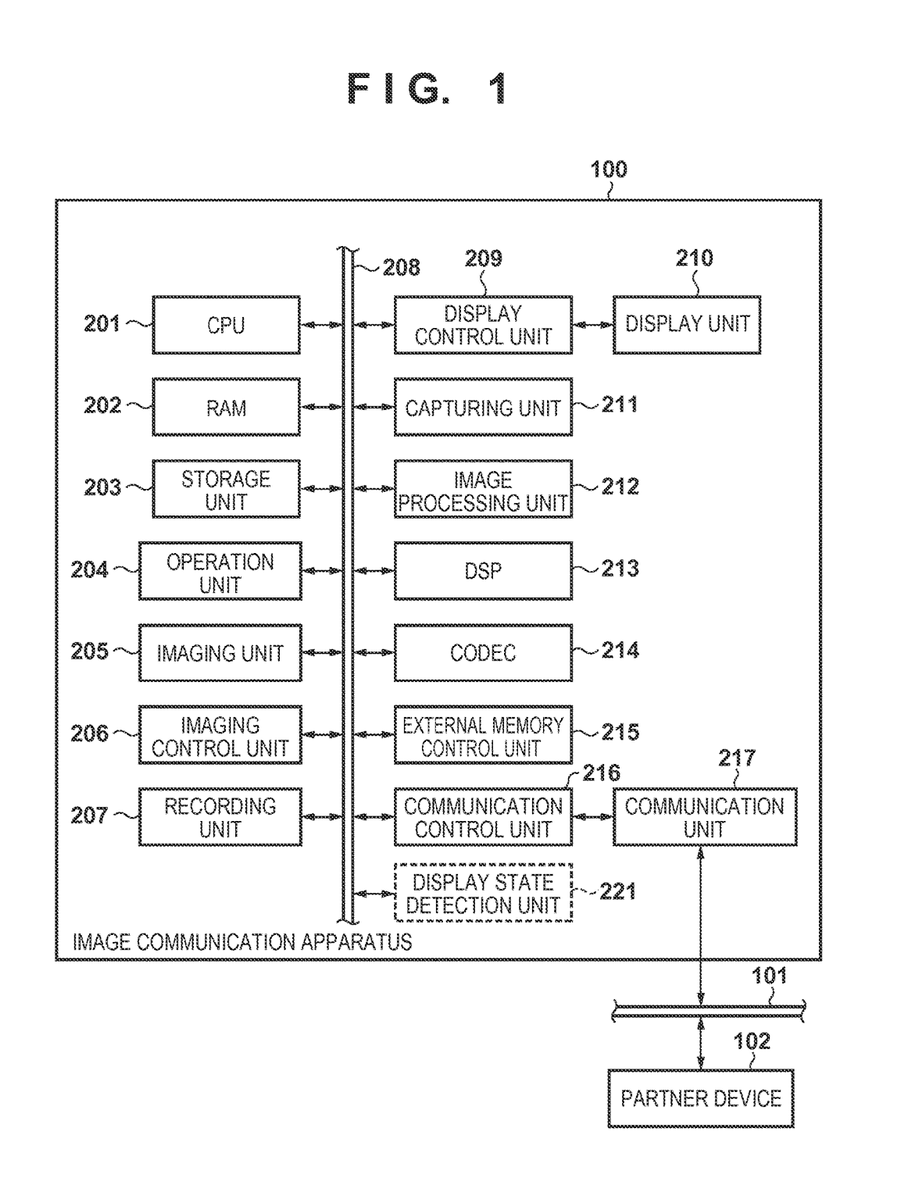
FIG. 1 is a block diagram showing the arrangement of an image communication apparatus according to an embodiment.

FIG. 1 is a block diagram showing the arrangement of an image communication apparatus 100 according to the embodiment. The image communication apparatus 100 has a function of transmitting image data to a communication partner apparatus (to be referred to as a "partner device" hereinafter) 102 mutually connected through a network 101, and a function of receiving image data from the partner device 102.

The image communication apparatus 100 is, for example, a tablet device, smartphone, personal computer (PC), mobile phone, television set, camera, video camera, head-mounted display, or the like. However, the image communication apparatus 100 is not limited to them, and any device having a hardware arrangement and module arrangement (both will be described later) is used as the image communication apparatus 100.

The network 101 is, for example, a wireless LAN (Local Area Network) as a home network. A wired LAN, WAN (Wide Area Network), ad hoc network, Bluetooth®, ZigBee®, UWB (Ultra Wide Band), or the like is usable as the network 101.

The partner device 102 has one or both of a function of transmitting image data to the image communication apparatus 100 and a function of receiving image data from the image communication apparatus 100. The partner device 102 is, for example, a tablet device, smartphone, PC, mobile phone, television set, camera, video camera, head-mounted display, projector, or the like. The partner device 102, however, is not limited to them.

In the image communication apparatus 100, a microprocessor (CPU) 201 uses a random access memory (RAM) 202 as a work memory to execute control programs stored in a storage unit 203 formed by a read only memory (ROM) and flash memory, thereby overall controlling respective units (to be described later) through a system bus 208. The CPU 201 inputs a user instruction from an operation unit 204 formed by buttons, a keyboard, a mode dial, and the like, and displays a user interface (UI) including a captured image and characters on a display unit 210 such as a liquid crystal display (LCD) through a display control unit 209. Note that the display unit 210 may have a touch screen function. In this case, the display unit 210 functions as part of the operation unit 204.

In accordance with a user instruction, an imaging unit 205 receives optical information of an object by imaging elements, and outputs image data obtained by analog-to-digital-converting the output signal of the imaging elements. Note that the imaging unit 205 includes a microphone, and can output, with the image data, sound data picked up by the microphone. In accordance with an instruction of the CPU 201, an imaging control unit 206 controls the imaging optical system of the imaging unit 205 to, for example, perform focusing, open/close the shutter, and adjust the aperture.

A digital signal processing unit (DSP) 213 performs various kinds of processes such as white balance processing, gamma processing, and noise reduction processing on the image data output from the imaging unit 205. An image processing unit 212 performs various kinds of image processes on the image data output from the imaging unit 205 or DSP 213.

A capturing unit 211 generates image data (to be referred to as a "captured image" hereinafter) by capturing an image displayed on the display unit 210. A captured image includes, for example, on-screen display (OSD) information such as operation buttons to be superimposed and displayed on video.

An encoding and decoding unit (CODEC) 214 performs encoding processing of encoding, compressing and multiplexing the image data and sound data, and decoding processing of decoding the image data and sound data by de-multiplexing and decoding the encoded, compressed and multiplexed data (to be referred to as "encoded data" hereinafter). For example, an MPEG-4 AVC/H.264 method is used for encoding and compression, and an MPEG-2 TS method is used for multiplexing. Note that MPEG is an abbreviation for the Moving Picture Experts Group, and MPEG-2 TS indicates a container format for multiplexing and transmitting media data such as encoded image and sound.

A recording unit 207 records, in a recording medium through an external memory control unit 215, encoded data which has been captured by the imaging unit 205 and encoded by the CODEC 214. For example, a hard disk drive, various memory cards, a USB (Universal Serial Bus) memory, and the like can be used as recording media.

In accordance with an instruction of the CPU 201, a communication control unit 216 controls a communication unit 217 serving as a network interface to transmit/receive encoded data and control information to/from the partner device 102. The communication control unit 216 can have a function of receiving remote control information transmitted from the partner device 102. In this case, the communication control unit 216 notifies the CPU 201 of a user instruction input in the partner device 102. The CPU 201 can handle the user instruction notified from the communication control unit 216, similarly to a user instruction input to the operation unit 204. Note that the remote control information is user operation information of a mouse, keyboard, joy stick, camera, gesture, or the like but is not limited to them.

The image communication apparatus 100 and the partner device 102 use, as a communication method, Wi-Fi Display of mirroring the display screen through the wireless LAN. Since image data includes a large amount of information, encoded data is used to transmit/receive the image data in Wi-Fi Display. Furthermore, RTP (Real-time Transport Protocol) is used as a data transfer protocol, and RTSP (Real Time Streaming Protocol) is used as a playback control protocol for the partner device 102.

RTP has been standardized as RFC3550 by IETF® (the Internet Engineering Task Force). RTP is a protocol for transmitting/receiving multimedia data such as a moving image and sound through the network in real time, and uses UDP (User Datagram Protocol) as a transport protocol in the lower layer. Furthermore, RTSP is a protocol for controlling streaming, which has been standardized as RFC2326, and uses TCP (Transmission Control Protocol) as a transport protocol in the lower layer. Since the CODEC 214 uses MPEG-2 TS for multiplexing, the communication unit 217 packetizes or depacketizes encoded data according to RFC2250 that defines the RTP payload format of MPEG-2 TS data.

Note that although there are components of the image communication apparatus 100 in addition to the above-described ones, they are not the gist of the present invention, and a description thereof will be omitted.

[Image Communication Control]

Figure 2:
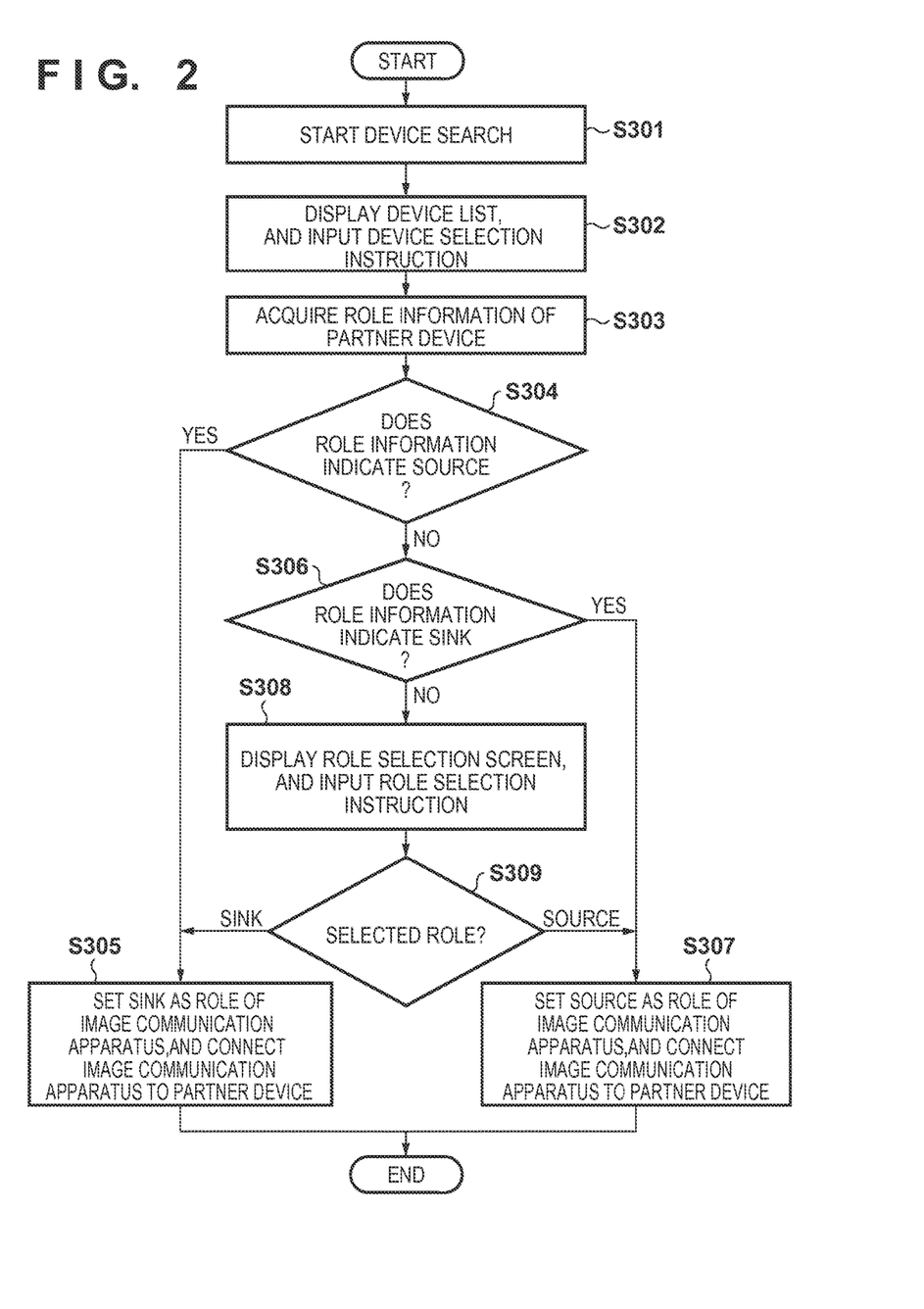
FIG. 2 is a flowchart for explaining communication mode control processing by an image communication apparatus according to the first embodiment.

FIG. 2 is a flowchart for explaining communication mode control processing by the image communication apparatus 100 according to the first embodiment. In response to a user instruction, the CPU 201 causes the communication control unit 216 to start to search for communicable devices (S301). The device search processing is performed by transmitting/receiving wireless management frames such as a beacon, probe request, and probe response based on the Wi-Fi P2P specification.

As described above, since the image communication apparatus 100 has the function of transmitting image data to the partner device 102 and the function of receiving image data from the partner device 102, the communication control unit 216 sets "dual role" as role information in the wireless management frame to be transmitted. The role information corresponds to "device-type" of a WFD IE included in the wireless management frame, and one of "source", "sink (primary sink or secondary sink)", and "dual role" is generally set as role information. Note that "WFD IE" is an abbreviation for "Wi-Fi Display information element".

The CPU 201 displays a list of discovered devices on the display unit 210, and inputs a device selection instruction by the user (S302). Note that the device search processing (S301) and the device selection processing (S302) can be performed by a near field wireless communication function (to be referred to as an "NFC function" hereinafter) and a touch operation. In this case, the communication unit 217 and the communication unit of the partner device 102 have the NFC function, the devices are paired by, for example, making the image communication apparatus 100 touch the partner device 102, and Wi-Fi Display takes over subsequent communication.

When the partner device 102 is selected, the communication control unit 216 acquires the role information of the partner device 102 (S303). The role information is acquired by referring to "device-type" of the WFD IE included in the wireless management frame which has been received from the partner device 102 in step S301. Note that during a period except for the device search processing, for example, during service search processing as an optional specification of Wi-Fi Display, it is possible to acquire role information from the wireless management frame received from the partner device 102. If NFC and a touch operation are used, the role information is transmitted/received at the time of the touch operation.

The communication control unit 216 determines whether the acquired role information indicates the source (S304). If the acquired role information indicates the source (the role of the partner device 102 is the source), the communication control unit 216 sets the sink as the role of the image communication apparatus 100, and connects the image communication apparatus 100 to the partner device 102 (S305). On the other hand, if the role information does not indicate the source, the communication control unit 216 determines whether the role information indicates the sink (S306). If the role information indicates the sink (the role of the partner device 102 is the sink), the communication control unit 216 sets the source as the role of the image communication apparatus 100, and connects the image communication apparatus 100 to the partner device 102 (S307). Note that the connection processing will be described in detail later.

If the role information indicates neither the source nor the sink, the role of the image communication apparatus 100 and that of the partner device 102 are dual roles. In this case, the CPU 201 displays a role selection screen on the display unit 210, and inputs a user instruction to select the role of the image communication apparatus 100 (S308).

Figure 3:
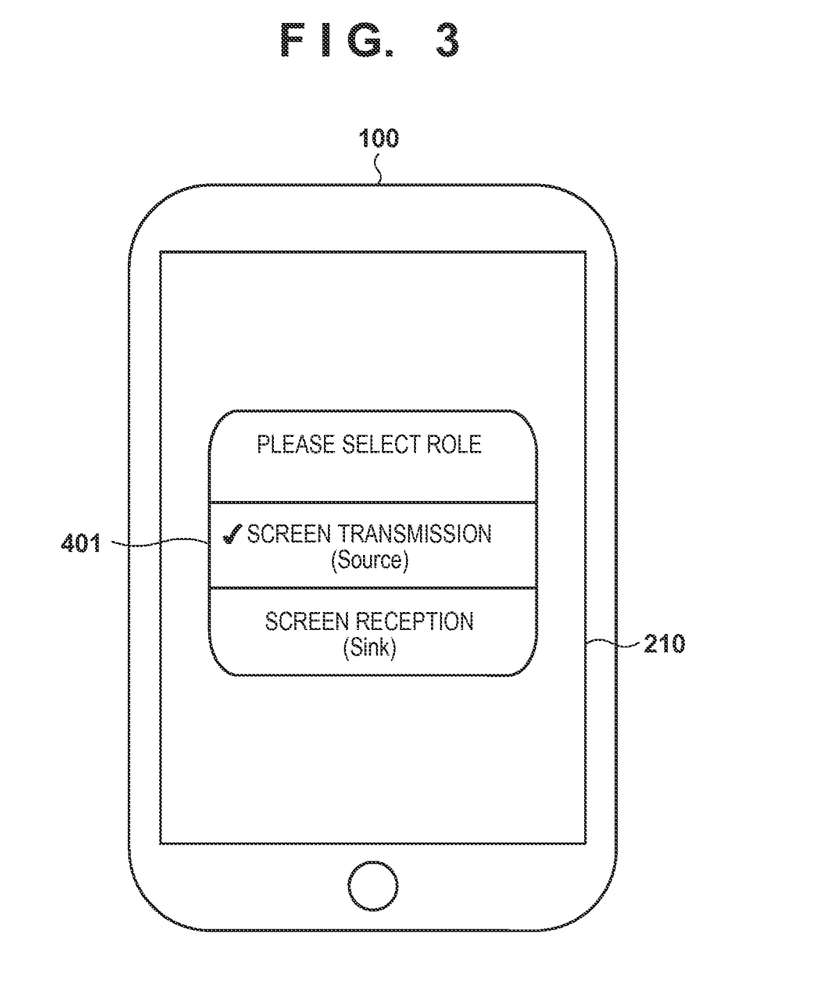
FIG. 3 is a view showing an example of a role selection screen.

FIG. 3 shows an example of the role selection screen. The CPU 201 displays, on the display unit 210, a role selection screen 401 including a button for selecting one of screen transmission (source) and screen reception (sink), and prompts the user to select the role of the image communication apparatus 100. Note that the role selection screen 401 includes no button for selecting a dual role. With the role selection screen 401, the user can arbitrarily select, as the role, one of the source for transmitting the screen and the sink for receiving the screen.

Note that even if both the devices are dual-role capable devices, the role selection screen 401 is displayed only when the selection operation (or touch operation) of the partner device 102 is performed in step S302, and is not displayed when the operation is not performed. This makes it possible to determine the roles of the image communication apparatus 100 and partner device 102 by a role selection operation in one of the devices.

After the role is selected through the role selection screen 401, the communication control unit 216 determines whether the source or sink has been selected as the role (S309). If the source has been selected, the communication control unit 216 sets the source as the role of the image communication apparatus 100, and connects the image communication apparatus 100 to the partner device 102 (S307). Alternatively, if the sink has been selected, the communication control unit 216 sets the sink as the role of the image communication apparatus 100, and connects the image communication apparatus 100 to the partner device 102 (S305).

Connection Processing

Figure 4A:
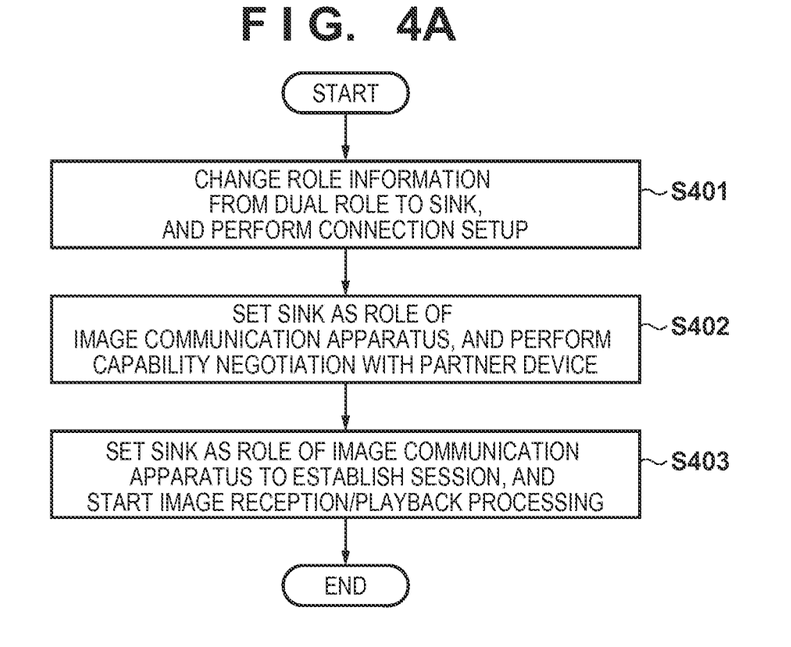
FIGS. 4A and 4B are flowcharts for explaining processing of connecting the image communication apparatus and a partner device.
Figure 4B:
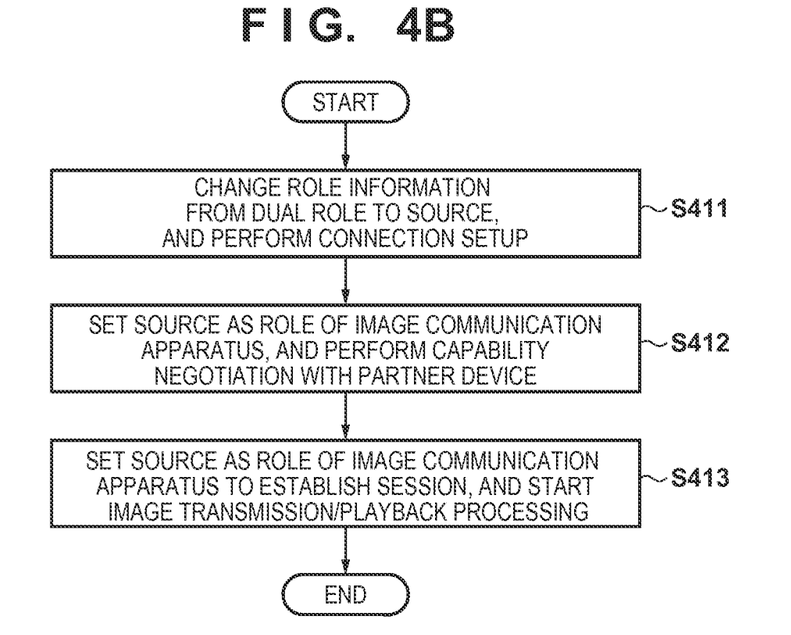

FIGS. 4A and 4B are flowcharts for explaining processing of connecting the image communication apparatus 100 and the partner device 102. FIG. 4A shows the processing (S305) of setting the sink as the role of the image communication apparatus 100 and connecting the image communication apparatus 100 to the partner device 102. FIG. 4B shows the processing (S307) of setting the source as the role of the image communication apparatus 100 and connecting the image communication apparatus 100 to the partner device 102.

Referring to FIG. 4A, the communication control unit 216 changes the role information in the wireless management frame to be transmitted from "dual role" to "sink", thereby performing a connection setup (S401). To set the role information, "device-type" of the WFD IE is used, as described above.

To perform a connection setup, a next wireless management frame is used based on the Wi-Fi Display specification. For example, a beacon, probe request/response, association request/response, re-association request/response, GO negotiation request/response/confirmation, P2P invitation request/response, provision discovery request/response, or the like is used. Note that GO is an abbreviation for "Group Owner".

The communication control unit 216 sets the sink as the role of the image communication apparatus 100, and performs capability negotiation with the partner device 102 (S402). The Wi-Fi Display specification defines the use of RTSP described above for capability negotiation to exchange predetermined messages from an RTSP M1 message to an RTSP M4 message with the partner device 102. When the image communication apparatus 100 functions as the sink, processing starts from reception of the RTSP M1 request transmitted from the partner device 102.

The communication control unit 216 sets the sink as the role of the image communication apparatus 100 to establish a session, thereby starting image reception/playback processing (S403). The Wi-Fi Display specification defines exchange of predetermined messages from an RTSP M5 message to an RTSP M7 message with the partner device 102 in a session establishment/playback start process. When the image communication apparatus 100 functions as the sink, processing starts from reception of the RTSP M5 request transmitted from the partner device 102.

Referring to FIG. 4B, the communication control unit 216 changes the role information in the wireless management frame to be transmitted from "dual role" to "source", thereby performing a connection setup (S411). To set the role information, "device-type" of the WFD IE is used, as described above. To perform a connection setup, the same wireless management frame as that in step S401 is used.

The communication control unit 216 sets the source as the role of the image communication apparatus to perform capability negotiation with the partner device 102 (S412). To perform capability negotiation, the same messages as those in step S402 are exchanged. When, however, the image communication apparatus 100 functions as the source, processing starts from transmission of the RTSP M1 request to the partner device 102.

The communication control unit 216 sets the source as the role of the image communication apparatus 100 to establish a session, thereby starting image transmission/playback processing (S413). In a session establishment/playback start process, the same messages as those in step S403 are exchanged. When, however, the image communication apparatus 100 functions as the source, processing starts from transmission of the RTSP M5 request to the partner device 102.

Connection Sequence

Figure 5:
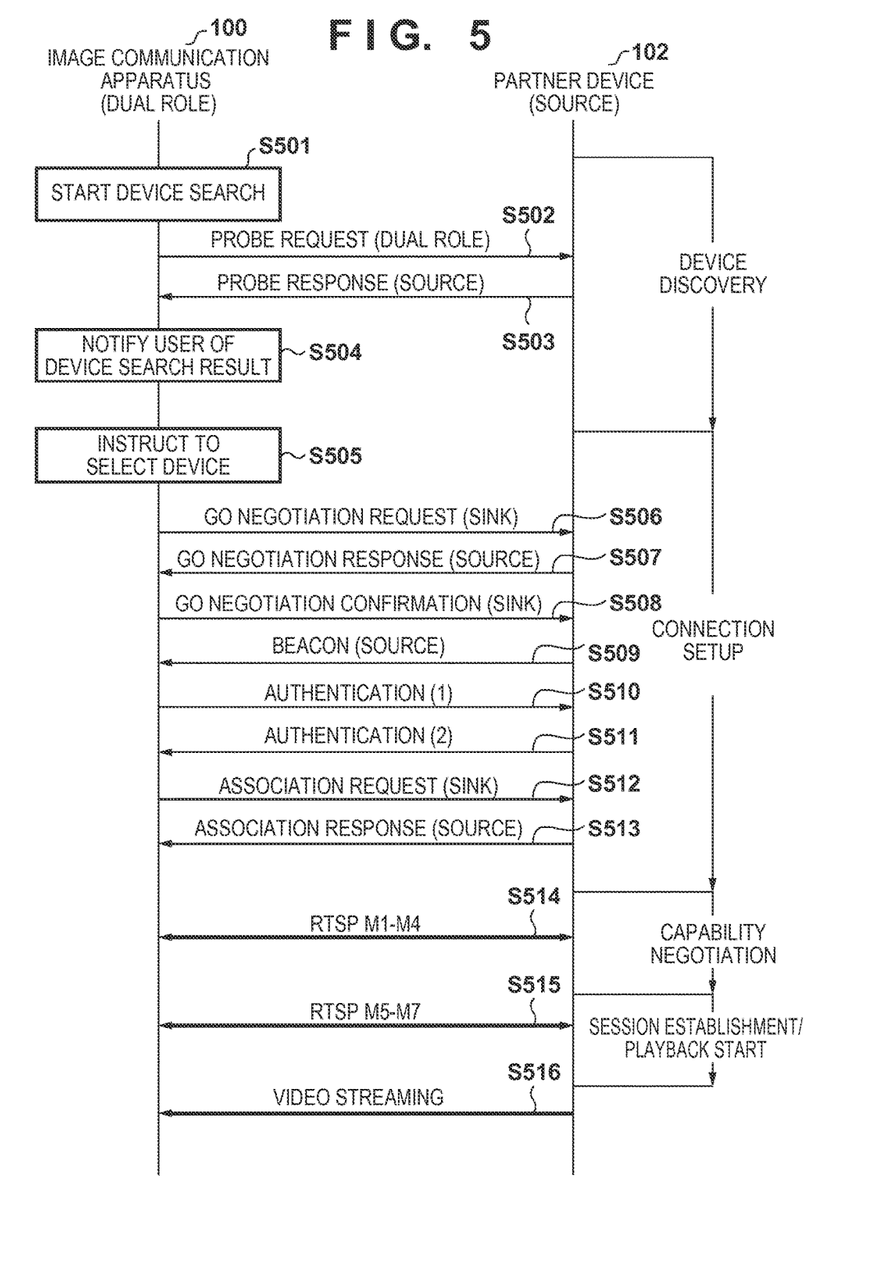
FIG. 5 is a sequence chart for explaining a sequence of connecting the image communication apparatus and the partner device (source).

A sequence of connecting the image communication apparatus 100 and the partner device 102 (source) will be described with reference to FIG. 5. As shown in FIG. 5, after a device discovery process (S501 to S504), connection setup process (S505-S513), capability negotiation process (S514), and session establishment/playback start process (S515) are performed, video streaming (S516) starts. Note that according to the optional specification of Wi-Fi Display, service capability detection (service discovery) and the like are prepared before the connection setup process (S505 to S513), but no service discovery is performed for the sake of simplicity.

In the device discovery process (S501 to S504), in response to a user instruction (S501) indicating the start of a device search, the image communication apparatus 100 and the partner device 102 transmit/receive a probe request (S502) and a probe response (S503). Note that wireless management frames transmitted/received at the time of a device search are defined in the Wi-Fi P2P specification, and a beacon and the like can be used.

In this example, assume that the image communication apparatus 100 has the dual-role function, and the partner device 102 has the source function. Therefore, role information indicating "dual role" is set in the probe request (S502) to be transmitted by the image communication apparatus 100, and role information indicating "source" is set in the probe response (S503) to be transmitted from the partner device 102. The image communication apparatus 100 detects the partner device 102 based on the probe response (S503) of the partner device 102, and notifies the user of the device search result (S504).

In the connection setup process (S505 to S513), when the user selects the partner device 102 from the device list (S505), the image communication apparatus 100 transmits/receives the predetermined wireless management frames (S506 to S513) to perform a connection setup. The wireless management frames transmitted/received in the connection setup process are defined in the Wi-Fi P2P specification, and it is possible to use the wireless management frame described with reference to the processing in step S401 in addition to the wireless management frames shown in steps S506 to S513.

The image communication apparatus 100 having the dual-role function recognizes, based on the role information of the received probe response (S503), that the partner device 102 has the source function, and then functions as the sink. Therefore, "sink" is set as the role information of each wireless management frame (S506, S508, or S512) to be transmitted by the image communication apparatus 100. On the other hand, "source" is set as the role information of each wireless management frame (S507, S509, or S513) to be transmitted from the partner device 102.

In the capability negotiation process (S514) and the session establishment/playback start process (S515), the predetermined RTSP messages defined in the Wi-Fi Display specification described with reference to the processes in steps S402 and S403 are transmitted/received. After that, video streaming (S516) from the partner device 102 to the image communication apparatus 100 starts.

A connection sequence when the image communication apparatus 100 and the partner device 102 are dual-role capable devices will be described with reference to FIG. 6. Unlike the sequence shown in FIG. 5, "dual role" is set as the role information of a probe response to be transmitted from the partner device 102 in a device discovery process.

In the device discovery process (S601 to S604), in response to a user instruction (S601) indicating the start of a device search, the image communication apparatus 100 and the partner device 102 transmit/receive a probe request (S602) and a probe response (S603). In this example, both the image communication apparatus 100 and the partner device 102 have the dual-role function, and role information indicating "dual role" is set in the probe request (S602) to be transmitted by the image communication apparatus 100 and the probe response (S603) to be transmitted from the partner device 102. The image communication apparatus 100 detects the partner device 102 based on the probe response (S603) of the partner device 102, and notifies the user of the device search result (S604).

In the connection setup process (S605 to S615), when the user selects the dual-role capable partner device 102 from the device list (S605), the image communication apparatus 100 displays the role selection screen (S606). For example, when the user operates the role selection screen to select the source (S607), the image communication apparatus 100 transmits/receives predetermined wireless management frames (S608 to S615) to perform a connection setup.

The image communication apparatus 100 has the dual-role function, and the user can select an arbitrary one of the source and sink as the role. In this example, the user has selected the source, and thus the image communication apparatus 100 functions as the source. Therefore, instead of "dual role", "source" is set as the role information of each wireless management frame (S608, S610, or S614) to be transmitted by the image communication apparatus 100. On the other hand, instead of "dual role", "sink" is set as the role information of each wireless management frame (S609, S611, or S615) to be transmitted from the partner device 102.

After a capability negotiation process (S616) and a session establishment/playback start process (S617), video streaming (S618) from the image communication apparatus 100 to the partner device 102 starts.

A sequence when both the image communication apparatus 100 and the partner device 102 are dual-role capable devices and the source is selected in each device will be described with reference to FIG. 7. Unlike the sequence shown in FIG. 6, the image communication apparatus 100 instructs to start a device search, the partner device 102 also instructs to start a device search, and the source is selected in each device.

In a device discovery process (S701 to S708), in response to a user instruction (S701) indicating the start of a device search in the image communication apparatus 100, the image communication apparatus 100 and the partner device 102 transmit/receive a probe request (S702) and a probe response (S703). Similarly to the sequence shown in FIG. 6, role information indicating "dual role" is set in the probe request (S702) to be transmitted by the image communication apparatus 100 and the probe response (S703) to be transmitted from the partner device 102. The image communication apparatus 100 detects the partner device 102 based on the probe response (S703) of the partner device 102, and notifies the user of the device search result (S704).

On the other hand, in response to a user instruction (S705) indicating the start of a device search in the partner device 102, the image communication apparatus 100 and the partner device 102 transmit/receive a probe request (S706) and a probe response (S707). Role information indicating "dual role" is set in the probe request (S706) to be transmitted from the partner device 102 and the probe response (S707) to be transmitted by the image communication apparatus 100. The partner device 102 detects the image communication apparatus 100 based on the probe response (S707) of the image communication apparatus 100, and notifies the user of the device search result (S708).

In a connection setup process (S709 to S716), the image communication apparatus 100 selects the dual-role capable partner device 102 (S709), and the partner device 102 selects the dual-role capable image communication apparatus 100 (S710). Therefore, each of the image communication apparatus 100 and the partner device 102 displays the role selection screen (S711 and S712).

The source is selected in each of the image communication apparatus 100 and the partner device 102 (S713 and S714), and the partner device 102 transmits a wireless management frame (a GO negotiation request (S715) in this example). Since the source has been selected in the image communication apparatus 100 and "source" has been set as the role information of the GO negotiation request (S715), the process cannot advance. That is, when both the roles of the image communication apparatus 100 and partner device 102 are the sources or sinks, the image communication apparatus 100 displays an error screen (S716), and notifies the user that the same role has been selected in the partner device 102. Similarly, the partner device 102 can notify the user of the error. After that, the role selection screen is redisplayed to reselect the role, or connection termination processing or the like is performed.

As describe above, it is possible to determine the role of the image communication apparatus 100 in accordance with the role of the partner device 102. When the partner device 102 is a dual-role capable device, the role selection screen to be used by the user to select the role is provided. This makes it possible to determine the role of the dual-role capable device automatically or by a simple operation without setting in advance the role of the dual-role capable device before a device search. Therefore, this can improve the user convenience by reducing a connection operation procedure with the partner device 102.

Second Embodiment

A communication apparatus and a control method therefor according to the second embodiment of the present invention will be described below. Note that in the second embodiment, the same reference numerals as those in the first embodiment denote the same components and detailed description thereof may be omitted. In the first embodiment, a case in which screen sharing starts from a device search has been explained. In the second embodiment, a case in which the role of an image communication apparatus 100 is set in accordance with the display state of a display unit 210 before a screen sharing instruction.

A display state detection unit 221 shown in FIG. 1 detects the display state of the display unit 210. For example, when an image loaded from a recording medium through an external memory control unit 215 is displayed on the display unit 210, the detection result of the display state detection unit 221 is a "data display state". On the other hand, when a standby screen, a home screen, an operation screen, or the like is displayed on the display unit, the detection result of the display state detection unit 221 is a "data non-display state". Data detected as the data display state is not limited to image data such as a still image and moving image, and includes text data, presentation data, graphics data, document data, and Web page data. Furthermore, an application screen for browsing the data is also included.

Figure 8:
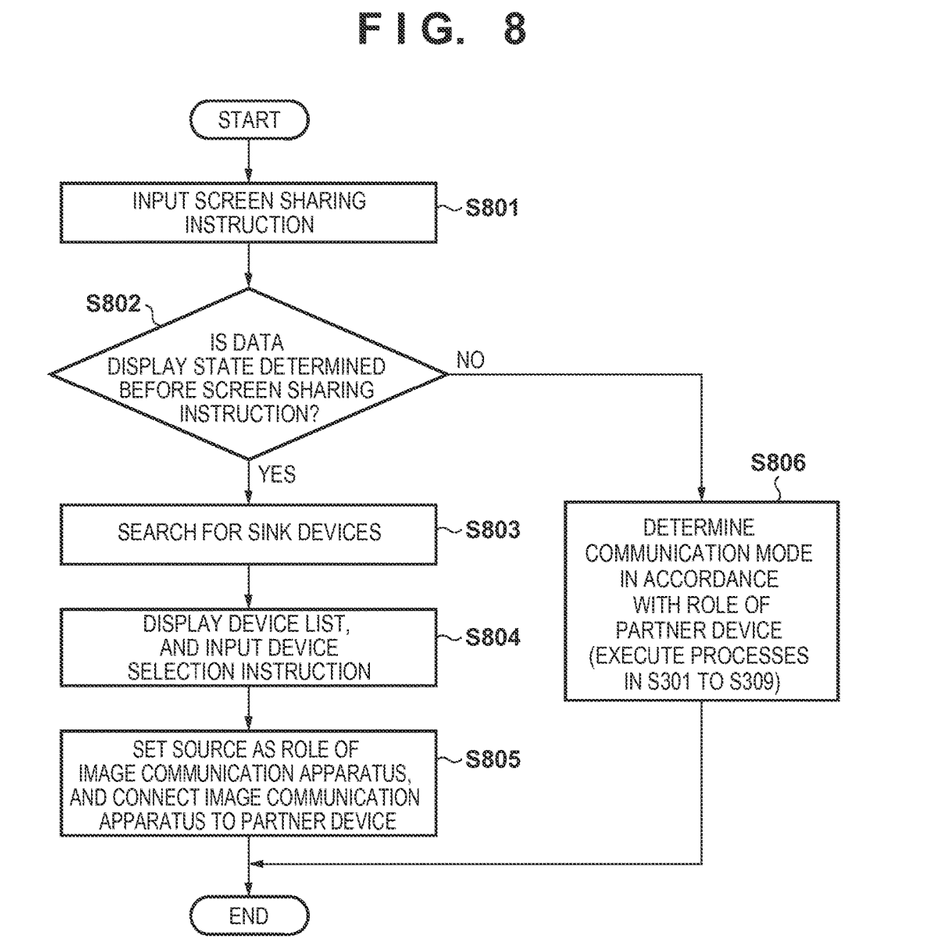
FIG. 8 is a flowchart for explaining communication mode control processing by an image communication apparatus according to the second embodiment.

FIG. 8 is a flowchart for explaining communication mode control processing by the image communication apparatus 100 according to the second embodiment. The CPU 201 inputs a user instruction indicating screen sharing (S801). A screen sharing button and operation screen are displayed on the display unit 210, and the user instructs screen sharing through an operation unit 204.

Figure 9:
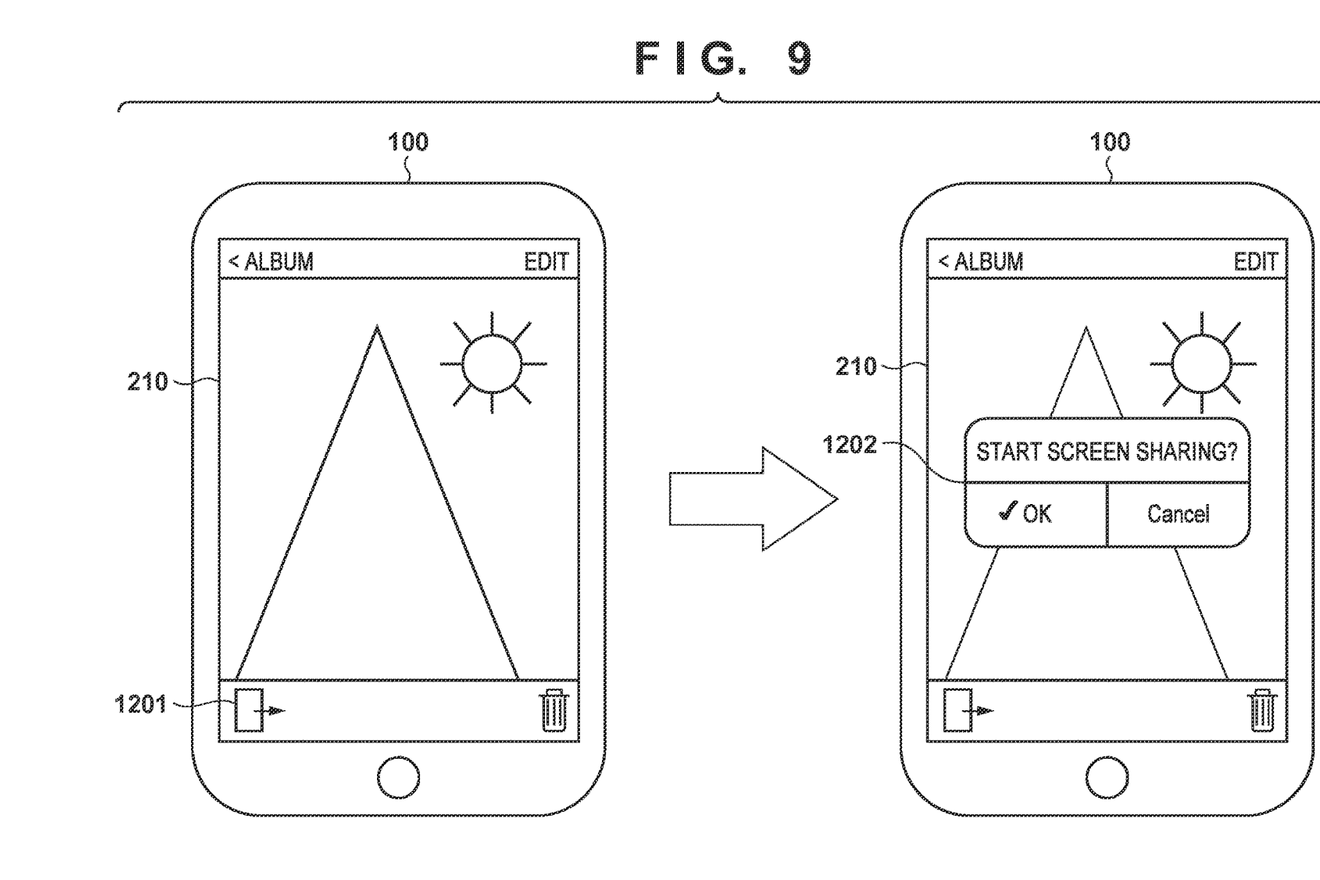
FIG. 9 is a view showing examples of the data display screen and screen sharing start screen of the image communication apparatus.

FIG. 9 shows examples of the data display screen and screen sharing start screen of the image communication apparatus 100. As shown in FIG. 9, on the display unit 210 of the image communication apparatus 100, an image is displayed and a screen sharing button 1201 is displayed in the lower portion of the image. Although FIG. 9 shows a case in which a captured still or moving image loaded from the recording medium is displayed, various data described above are screen sharing targets. When the user touches the screen sharing button 1201, a screen sharing start confirmation dialog 1202 is displayed on the display unit 210, and screen sharing starts upon touching an OK button by the user.

The display state detection unit 221 determines the data display state before the screen sharing instruction (S802). If the display state detection unit 221 determines the data display state, the image communication apparatus 100 functions as a source device for transmitting the display screen. In the example of FIG. 9, the captured image is displayed before the screen sharing instruction, the display state detection unit 221 determines the data display state, and the image communication apparatus 100 functions as a source device. Therefore, a communication control unit 216 starts to search for devices (sink devices and dual-role capable devices) having the sink function, which are communicable devices (S803).

A CPU 201 displays a list of the discovered devices, and inputs a device selection instruction by the user (S804). That is, a list of devices (sink devices and dual-role capable devices) having the sink function, which have been discovered in the search processing in step S803, is displayed on the display unit 210, and the user selects a desired connection destination through the operation unit 204. The communication control unit 216 sets the source as the role of the image communication apparatus 100, and connects the image communication apparatus 100 to a partner device 102 (S805). The connection sequence is the same as in the first embodiment and a description thereof will be omitted.

On the other hand, if the display state detection unit 221 determines the data non-display state, the image communication apparatus 100 determines the communication mode in accordance with the role of the partner device 102, and thus performs the same processing as the communication mode control processing (S301 to S309) in the first embodiment (S806).

Figure 10:
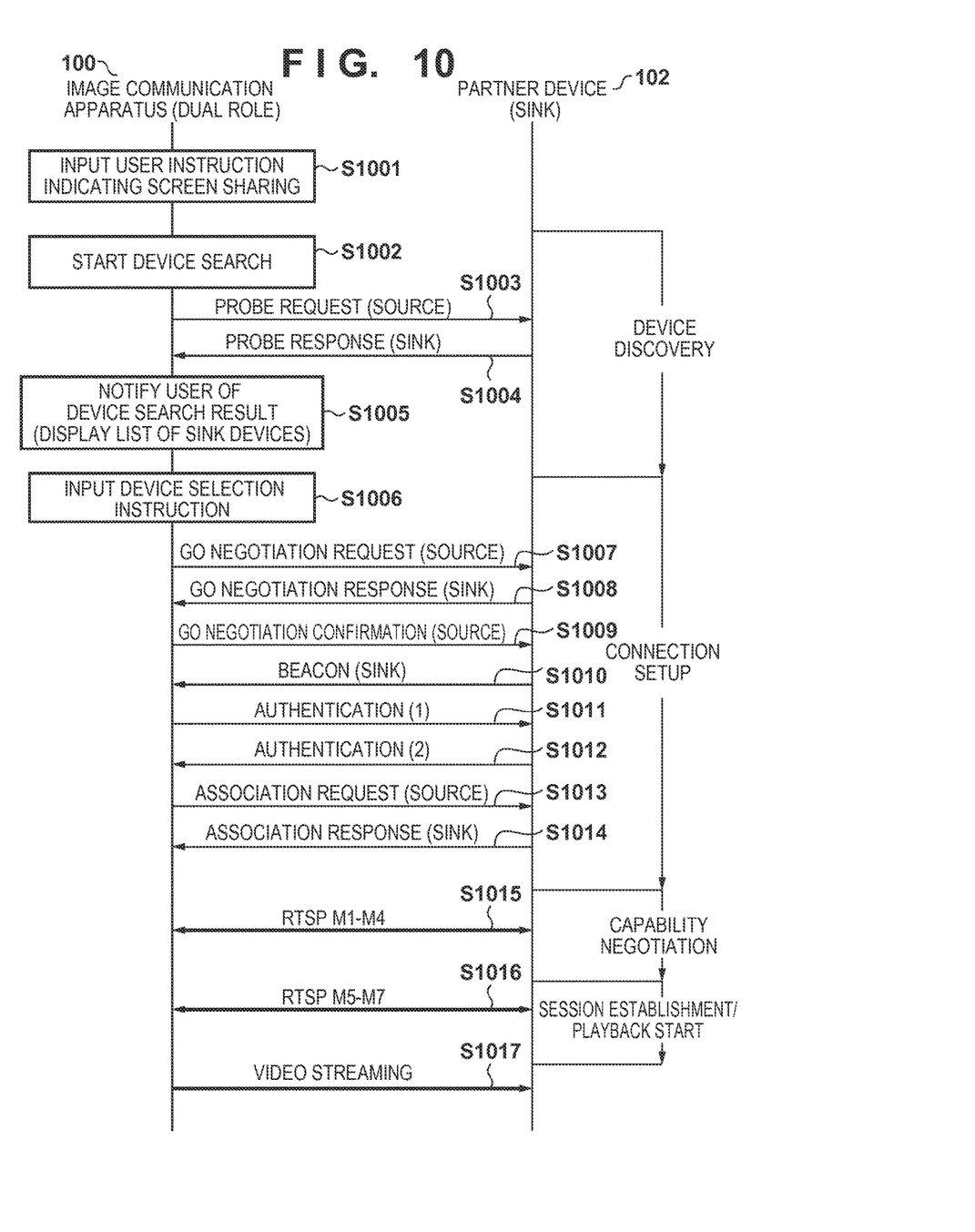
FIG. 10 is a sequence chart for explaining a sequence of connecting the image communication apparatus and a partner device (sink) according to the second embodiment.

A sequence of connecting the image communication apparatus 100 and the partner device 102 (sink) according to the second embodiment will be described with reference to FIG. 10. In response to a user instruction (S1001) indicating screen sharing, the image communication apparatus 100 starts to search for devices (S1002). The image communication apparatus 100 has the dual-role function but functions as a source device when the display unit 210 is in the data display state before the screen sharing instruction. Therefore, instead of "dual role", "source" is set as role information in a probe request (S1003) to be transmitted by the image communication apparatus 100. As a result, probe responses (S1004) transmitted from devices (sink devices and dual-role capable devices) having the sink function are received, and a list of the devices having the sink function is displayed as a device search result notification (S1005).

When the user selects the partner device 102 from the device list (S1006), the image communication apparatus 100 transmits/receives predetermined wireless management frame (S1007 to S1014) to perform a connection setup.

Figure 6:
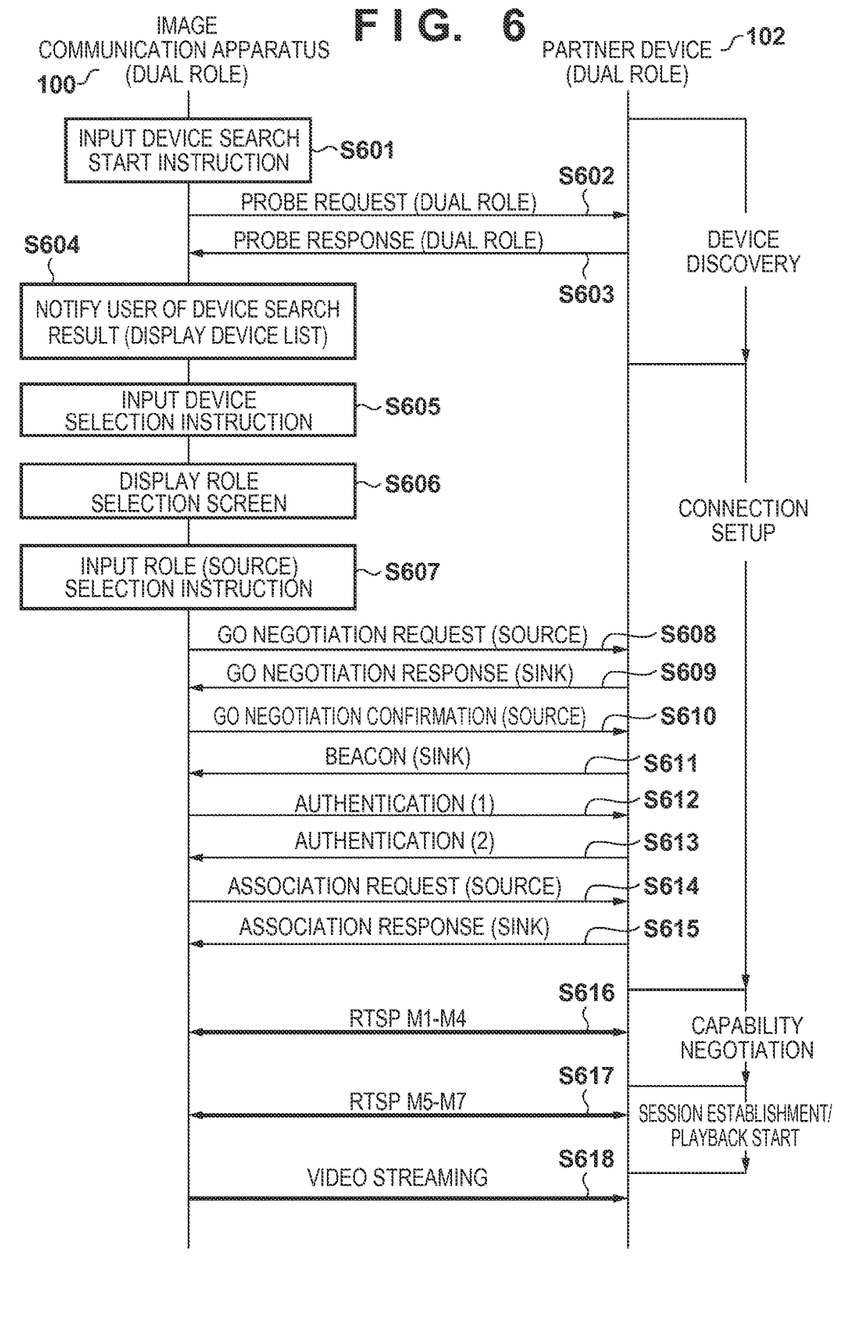
FIG. 6 is a sequence chart for explaining a connection sequence when both the image communication apparatus and the partner device are dual-role capable devices.
Figure 7:
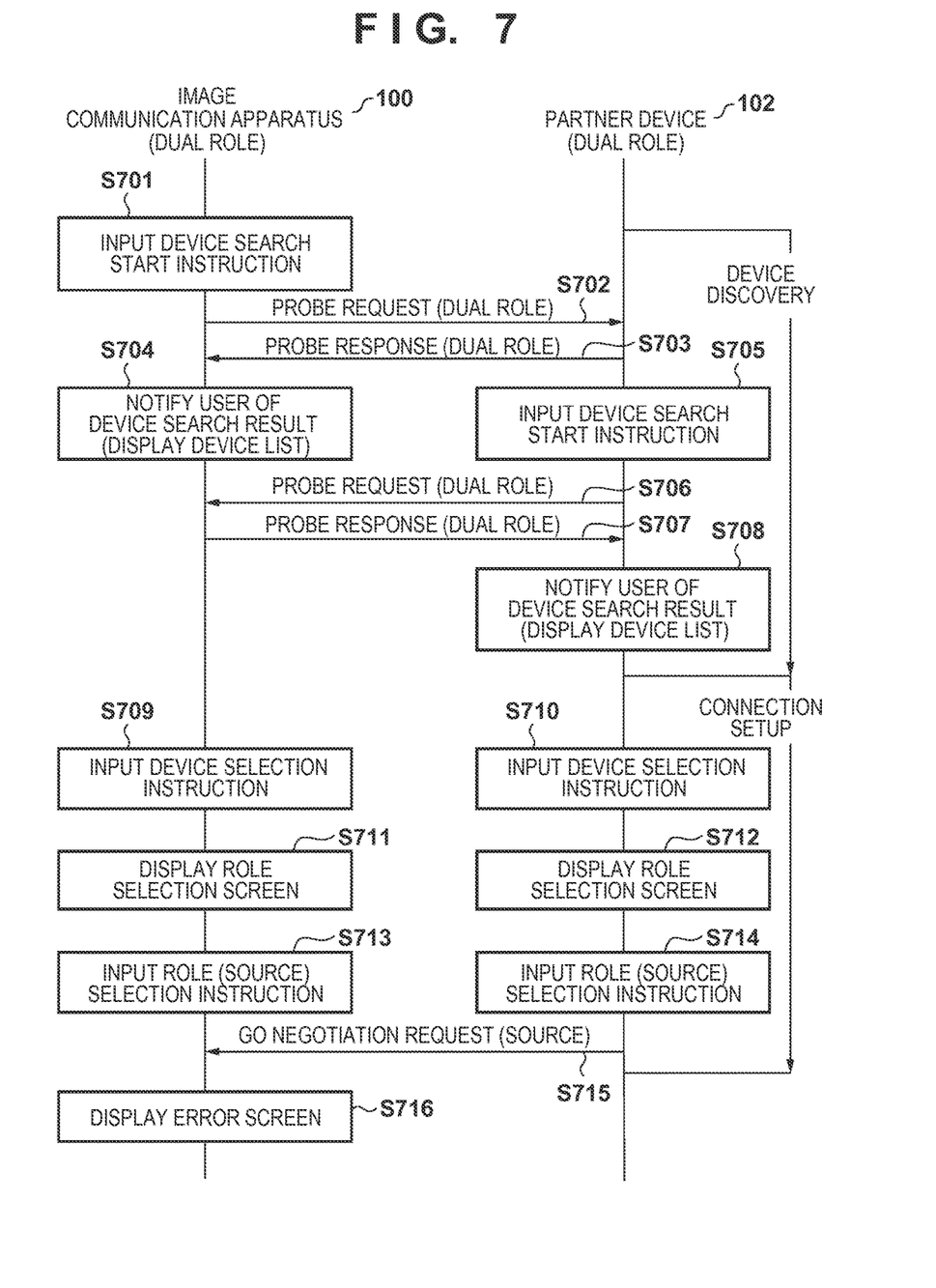
FIG. 7 is a sequence chart for explaining a sequence when both the image communication apparatus and the partner device are dual-role capable devices and a source is selected in each device.

Processes (S1015 to S1017) after the connection setup process are the same as those (S616 to S618) shown in FIG. 6 and a description thereof will be omitted.

As described above, it is possible to determine the role of the image communication apparatus 100 in accordance with the data display state of the display unit 210 before the screen sharing instruction. This can automatically determine the role of the dual-role capable device without setting in advance the role before a device search. Therefore, it is possible to improve the user convenience by reducing a connection operation procedure with the partner device 102.

Modification of Embodiments

In the above-described embodiments, a case in which MPEG-4 AVC/H.264 is used as a video encoding and decoding method has been explained. It is possible to use other encoding and decoding methods such as MPEG-2 or HEVC/H.265. Furthermore, although MPEG-2 TS is used the container format of encoded video, other container formats such as the MP4 format, MOV format, or AVCHD format can be used.

In the above-described embodiments, a case in which RTP is used as a data transfer protocol has been explained. It is possible to user other protocols in the same layer or another layer of the OSI (Open Systems Interconnection) reference model, such as HTTP (HyperText Transfer Protocol), HTTPS (HyperText Transfer Protocol Secure), and TCP. Furthermore, although a case in which RTSP is used as a playback control protocol has been explained, the present invention is not limited to this. For example, playback control protocols such as SIP (Session Initiation Protocol) and SOAP (Simple Object Access Protocol) can be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-167001, filed Aug. 19, 2014, which is hereby incorporated by reference herein in its entirety.

What is claimed is:

1. A communication apparatus comprising:
one or more processors; and
one or more memories including instructions that, when executed by the processor, cause the communication apparatus to:
select another apparatus to be connected by the communication apparatus;
wirelessly receive, from the selected apparatus, information indicating that the selected apparatus is a source device which transmits data being played by the source device or a sink device which receives and plays data being played by another source device; and
select, based on whether the received information indicates that the selected apparatus is the source device or the sink device, whether the communication apparatus, which is a dual-role device capable of operating as the sink device or the source device selectively, operates as the sink device or the source device,
wherein,
(1) in a case where the received information indicates that the selected apparatus is the source device, the instructions cause the communication apparatus to select the communication apparatus to operate as the sink device to connect to the selected device,
(2) in a case where the received information indicates that the selected apparatus is the sink device, the instructions cause the communication apparatus to select the communication apparatus to operate as the source device to connect to the selected device.

2. The communication apparatus according to claim 1, wherein the communication apparatus receives a wireless management frame which contains the information indicating a role while searching for another apparatus or a service.

3. The communication apparatus according to claim 1, wherein the communication apparatus comprises a function of near field wireless communication (NFC), and the communication apparatus receives the information indicating a role by NFC.

4. The communication apparatus according to claim 1, wherein, in a case where the received information indicates that the selected apparatus is the dual-role device, the instructions cause the communication apparatus to display a role selection screen on a display unit of the communication apparatus to select whether the communication apparatus operates as the source device or the sink device.

5. The communication apparatus according to claim 4, wherein, in a case where a role of the communication apparatus selected by the role selection screen is identical with a role of the selected device set in the selected device, the instructions further cause the communication apparatus to display an error screen on the display unit of the communication apparatus.

6. The communication apparatus according to claim 1, wherein the instructions further cause the communication apparatus to search one or more other apparatuses upon receiving a wireless signal, and select the other apparatus to be connected by the communication apparatus from the searched one or more other apparatuses.

7. The communication apparatus according to claim 6, wherein the wireless signal represents a beacon or a probe response.

8. The communication apparatus according to claim 6, wherein the wireless signal comprises information indicating that the selected apparatus is the source device, the sink device, or the dual-role device.

9. The communication apparatus according to claim 6, wherein, in a case where an instruction for communication of image data of a display is instructed before the search for another apparatus, the instructions further cause the communication apparatus to set a role of the communication apparatus, based on a display state of a display unit of the communication apparatus before the instruction is instructed.

10. The communication apparatus according to claim 9, wherein, in a case where the display state indicates a display of a still image, moving image, text data, presentation data, graphics data, document data, or web page data, or a display of an application screen for browsing data, the instructions further cause the communication apparatus to operate as the source device as the role of the communication apparatus.

11. The communication apparatus according to claim 9, wherein, in a case where the display state indicates a display of a standby screen, home screen, or operation screen, the instructions further cause the communication apparatus to set a role of the communication apparatus based on a role of the selected device.

12. The communication apparatus according to claim 1, wherein the source device is a device which transmit image data, and the sink device is a device which receives image data.

13. The communication apparatus according to claim 1, the instructions further cause the communication apparatus to, after selecting whether the communication apparatus operates as the sink device or the source device based on whether the received information indicates that the selected apparatus is the source device or the sink device, decide that either the communication apparatus or the selected apparatus operates as a Group Owner according to a Wi-Fi Direct to connect to the selected apparatus.

14. A method of controlling a communication apparatus, the method comprising:
   selecting another apparatus to be connected by the communication apparatus;
   wirelessly receiving, from the selected apparatus, information indicating that the selected apparatus is a source device which transmits data being played by the source device or a sink device which receives and plays data being played by another source device; and
   selecting, based on whether the received information indicates that the selected apparatus is the source device or the sink device, whether the communication apparatus, which is a dual-role device capable of operating as the sink device or the source device selectively, operates as the sink device or the source device,
   wherein,
   (1) in a case where the received information indicates that the selected apparatus is the source device, causing the communication apparatus to select the communication apparatus to operate as the sink device to connect to the selected device,
   (2) in a case where the received information indicates that the selected apparatus is the sink device, causing the communication apparatus to select the communication apparatus to operate as the source device to connect to the selected device.

15. A non-transitory computer readable medium storing a computer-executable program for causing a computer to perform a method of controlling a communication apparatus, the method comprising:
   selecting another apparatus to be connected by the communication apparatus;
   wirelessly receiving, from the selected apparatus, information indicating that the selected apparatus is a source device which transmits data being played by the source device or a sink device which receives and plays data being played by another source device's display; and
   selecting, based on whether the received information indicates that the selected apparatus is the source device or the sink device, whether the communication apparatus, which is a dual-role device capable of operating as the sink device or the source device selectively, operates as the sink device or the source device,
   wherein,
   (1) in a case where the received information indicates that the selected apparatus is the source device, causing the communication apparatus to select the communication apparatus to operate as the sink device to connect to the selected device,
   (2) in a case where the received information indicates that the selected apparatus is the sink device, causing the communication apparatus to select the communication apparatus to operate as the source device to connect to the selected device.

\* \* \* \* \*